US006956843B1

(12) United States Patent
Breivik et al.

(10) Patent No.: US 6,956,843 B1
(45) Date of Patent: Oct. 18, 2005

(54) METHOD FOR IMPROVING THE SETUP OF TELEPHONE-TO-TELEPHONE CALLS

(75) Inventors: Øyvind Breivik, Oslo (NO); Paul Torkil Fjuk, Skjetten (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/555,592

(22) PCT Filed: Nov. 11, 1998

(86) PCT No.: PCT/NO98/00336

§ 371 (c)(1),
(2), (4) Date: Sep. 20, 2000

(87) PCT Pub. No.: WO99/29123

PCT Pub. Date: Jun. 10, 1999

(30) Foreign Application Priority Data

Dec. 1, 1997 (NO) ........................... 975518

(51) Int. Cl.$^7$ ........................... H04L 12/66; H04M 7/00
(52) U.S. Cl. ........................... 370/352; 379/230
(58) Field of Search ........................... 370/352, 354, 370/355, 356, 237; 379/230

(56) References Cited

U.S. PATENT DOCUMENTS

| 6,014,379 | A | * | 1/2000 | White et al. ................. 370/389 |
| 6,021,126 | A | * | 2/2000 | White et al. ................. 370/352 |
| 6,064,653 | A | * | 5/2000 | Farris ........................... 370/237 |
| 6,069,890 | A | * | 5/2000 | White et al. ................. 370/352 |
| 6,075,783 | A | * | 6/2000 | Voit ............................. 370/352 |
| 6,097,719 | A | * | 8/2000 | Benash et al. .............. 370/352 |
| 6,282,281 | B1 | * | 8/2001 | Low ............................. 379/230 |
| 6,292,478 | B1 | * | 9/2001 | Farris .......................... 370/356 |
| 6,324,264 | B1 | * | 11/2001 | Wiener et al. .............. 379/88.22 |
| 6,449,270 | B1 | * | 9/2002 | Miloslavsky ................ 370/356 |
| 6,470,010 | B1 | * | 10/2002 | Szviatovszki et al. ...... 370/356 |
| 6,529,501 | B1 | * | 3/2003 | Zhao et al. .................. 370/353 |
| 6,546,003 | B1 | * | 4/2003 | Farris .......................... 370/352 |

(Continued)

FOREIGN PATENT DOCUMENTS

WO      WO 9535632 A1    12/1995

(Continued)

OTHER PUBLICATIONS

Mi Zhengkun, "Architecture and Protocols for IN/INTERNET Interworking", ICCT'98, Proceedings of the International Conference on Communication Technology, Oct. 22-24, 1998, pp. S24-05-1 to S24-05-5.*

(Continued)

*Primary Examiner*—Chau Nguyen
*Assistant Examiner*—Blanche Wong

(57) ABSTRACT

Method for setting up telephone-to-telephone calls using telephones connected to a PSTN/ISDN access network and using a separate packet-switched network as a by-pass network, wherein telephone gateways (GW) provide bridges between the access network and the by-pass network, and connections are established between a calling party (A) telephone and a first gateway (GWa) and between a second gateway (GWb) and a called party (B) telephone. The method includes the steps of: dialing, by a calling party (A) in a one-step procedure, a by-pass network service prefix together with the number of a called party (B), wherein the by-pass network service prefix includes an IN-service prefix; and analyzing the by-pass network service prefix to identify the relevant IN service for thereby routing the call to an IN node which can execute the IN service, the IN service establishing a call to a first gateway (GWa) selected from one of a plurality of gateways (GW), whereby the first gateway is made service transparent to the calling party (A).

5 Claims, 1 Drawing Sheet

U.S. PATENT DOCUMENTS

| | | | |
|---|---|---|---|
| 6,584,094 B2 * | 6/2003 | Maroulis et al. | 370/352 |
| 6,597,686 B1 * | 7/2003 | Smyk | 370/352 |
| 2001/0043586 A1 * | 11/2001 | Miloslavsky | 370/352 |

FOREIGN PATENT DOCUMENTS

| | | |
|---|---|---|
| WO | WO 9638018 A1 | 11/1996 |
| WO | WO 9716007 A1 | 5/1997 |
| WO | WO 9722210 A2 | 6/1997 |

OTHER PUBLICATIONS

Scott Shenker, David D. Clark, and Lixia Zhang, "Services or Infrastructure: Why We Need a Network Service Model", Proceedings of 1st International Workshop on Community Networking Integrated Multimedia Services to the Home, Jul. 13-14, 1994, p. 145-149.*

Kowalska, E.; International Search Report on International App. No. PCT/SE98/00336; Jun. 15, 1999; pp. 1-3.

* cited by examiner

METHOD FOR IMPROVING THE SETUP OF TELEPHONE-TO-TELEPHONE CALLS

FIELD OF THE INVENTION

Generally, the present invention relates to Internet telephony and intelligent networks (IN) function. More specifically, the present invention relates to a method for improving the setup of telephone-to-telephone calls using telephones connected to a PSTN/ISDN access network and using a separat network, especially Internet as a substantial by-pass network, special telephone gateways (GW) forming bridges between the access network and said by-pass network, and connections being established between the user telephones (A,B) and the gateways (GW) that bridge the call.

BACKGROUND OF THE INVENTION

The application area of the present invention has been developed in connection with low tariff international telephone-to-telephone calls using the Internet as the main carrier network, but the general aspect of the invention may also be related to any quality of service required.

Furthermore, the present invention is applicable not oly to international and long distance services but also to any other geographically segmented services (e.g. local, regional, national).

Users have telephones connected to the PSTN/ISDN network. The Internet can be used to carry portions of the traditional PSTN/ISDN telephone-to-telephone calls. Special Internet telephony gateways GW form bridges between the PSTN/ISDN access network and the Internet (which acts as the carrier network).

In a traditional telephone-to-telephone call, a connection between two parties is established at the call set-up phase. The originating party and the terminating party are identified by their respective telephone numbers (caller A-num and callee B-num) during the set-up phase. Call logic is handled by the PSTN/ISDN network. In a telephone-to-telephone call using the PSTN/ISDN network as the access network and the Internet as the main carrier network, connections must be established between the user telephones and the gateways that bridge the call. The present invention presents a solution to the handling of call-establishment to the originating gateway. Extensions and enhancements to the basic invention are described later.

PRIOR ART

Existing solution and problems with these

Referring to FIG. 1, there will now be given a description about how a traditional internation call path is established.

The known solutions handle call establishment in two phases. First, the caller (A) is required to set up a connection to a preferred originating gateway (Gwa). Second, the caller is required to dial the desired number that identifies the terminating telephone (B-num).

As an illustration, a typical, although simplified, call handling sequence is as follows:

1. The caller (A) obtains a PSTN/ISDN connection to an originating gateway (Gwa) by dialing the gateway number.
2. GWa sends a new dial tone or a voice message to A to indicate that the connection has been established.
3. The caller (A) dials the number that identifies the callee (B). (The gateway may extract the B-number from the connection by interpreting Dual Tone Multiple Frequency (DTMF) signals. Prior to this A may need to enter a PIN number or similar for authorization purposes).
4. GWa performs a number analysis on the B-number to find the closest GW (Gwb) to B.
5. GWa establishes a data connection (connection oriented or connectionless) to the terminating gateway (Gwb) and transfers the B-number to Gwb using the data network.
6. GWb in turn establishes the final PSTN/ISDN connection to the called party (B).

One advantage of the known solutions, in this context, is that they make use of standard PSTN/ISDN functions. However, the known solutions require the caller to handle the call set up in two distinct phases which is cumbersome. The caller is also required to know the telephone number of the preferred (i.e., closest) gateway. Indeed, the caller may need to keep a list of gateway telephone numbers if the preferred one is busy, or if it is down, or if other circumstances make it unavailable.

There are also other problems to the known solutions. These are addressed in a later chapter which provides extensions to the present invention described prior thereto.

OBJECTS OF THE PRESENT INVENTION

An object of the present invention is to provide a method for improving the setup of telephone-to-telephone calls in relation to the prior art procedures.

Another object of the present invention is to provide a method by which the caller is allowed to handle the call set-up in one single phase, as in the case of traditional "local" telephone calls.

More specifically, an object of the present invention is to make the associated gateways transparent to the caller.

Still another object of the present invention is to utilize Internet telephony and intelligent networks (IN) functions in a far more efficient and less costly manner.

BRIEF DISCLOSURE OF THE INVENTION

The above objects are achieved in a method as stated in the preamble, which according to the present invention is characterized in that for the purpose of making the gateways transparent to the caller (A) the method allows the caller (A) to dial a by-pass network service prefix together with the number of the callee (B).

More specifically, it is according to the invention suggested that said by-pass network service prefix, i.e. an IN service prefix is adapted to identify the relevant IN service for thereby routing the call to an IN node which can execute this IN service.

In other words, the present invention allows the caller to handle the call set-up in one single phase, just as in case of conventional telephone calls, at the same time as the gateways appear transparent to said caller.

Further features and advantages of the present invention will appear from the following description taken in conjunction with the enclosed drawings, as well as from the appending patent claims.

BRIEF DISCLOSURE OF THE DRAWINGS

DETAILED DESCRIPTION OF EMBODIMENTS

Figure 1:
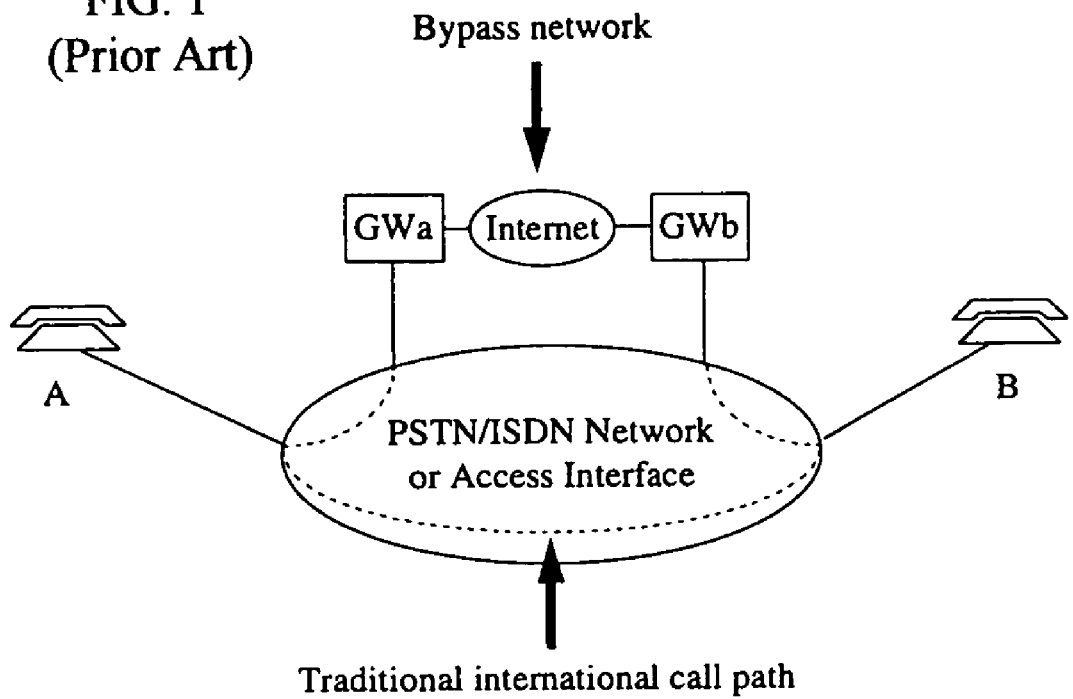
FIG. 1 is a sketch illustrating a traditional international call path.

FIG. 1 illustrates a traditional international call path, which has been discussed previously, and wherein the set-up of telephone-to-telephone calls are made using telephones connected to a PSTN/ISDN access network and using a separate network, here the Internet as a substantial by-pass network, special telephone gateways GWa and GWb forming bridges between the access network and said by-pass network, and connections being established between a caller telephone A and a callee telephone B through appropriate gateways GWa and GWb.

Figure 2:
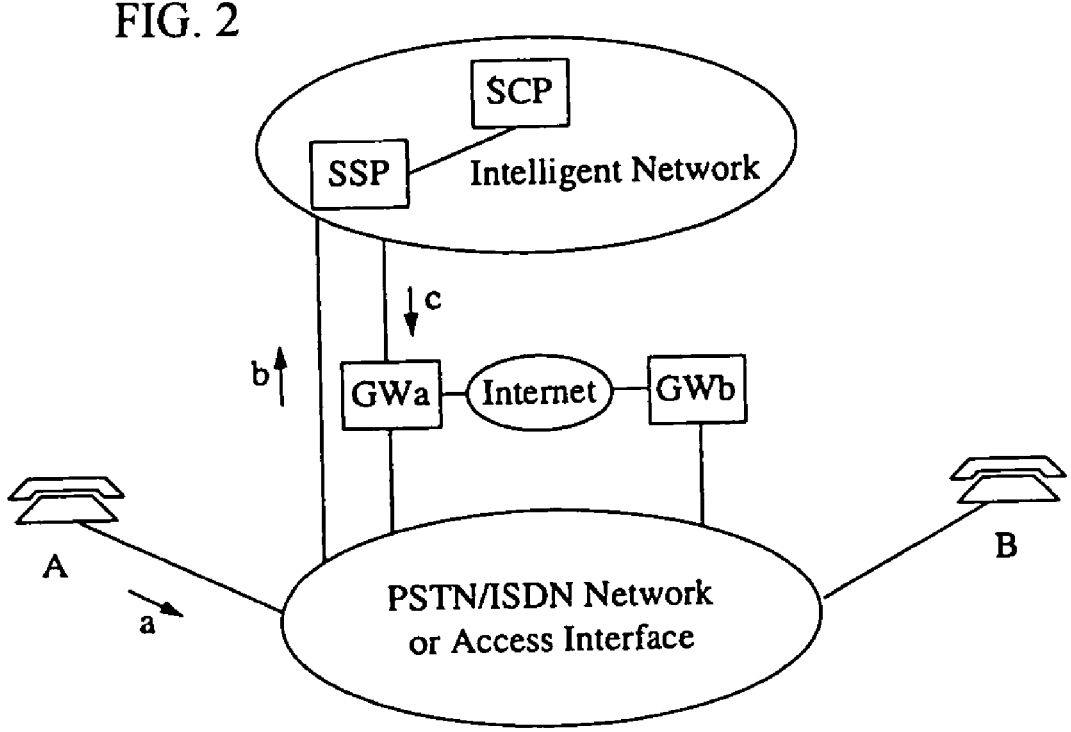
FIG. 2 is a sketch illustrating an embodiment of the method according to the present invention.

An embodiment of the present method is illustrated in FIG. 2, wherein the handling of call establishment will only take place in one phase.

More specifically, the present solution uses the Intelligent Network to:

1. Allow the user to establish a call in one single phase.

The user dials one number: IN service prefix+B-number. IN service prefix identifies the IN service: 'International calls over the Internet'. IN service prefix is used to route the call to the IN node which executes this IN service.

2. Automatically find the closest/available gateway

The IN service 'International calls over the Internet' will find the closest GW by analysing the A-number. The service can also route to alternative Gws if the closest is busy, etc.

3. Establish call to the GW

The IN service will establish the call to GW, hereby named Gwa. In the call setup the Gwa number is included as destination number. In addition, the A and B-number is included.

A proposal/example on how this can be transferred on ISUP (IAM message)/DSS1 (SETUP message):

CallingPartyNumber: A-number
CalledPartyNumber: Gwa-number
RedirectingNumber: B-number The information flow (see FIG. 2) is as follows:

a=A dials: (IN service prefix+B-number) in one sequence
b=Call routed to IN:
   CallingPartyNumber: A-number
   CalledPartyNumber: (IN service prefix+B-number)
c=Call routed to Gwa:
   CallingPartyNumber: A-number
   CalledPartyNumber: Gwa-number
   RedirectingNumber: B-number

RESTRICTIONS

1. The invention couples gateway functionality with IN which makes the gateway equipment dependent on IN functionality. The provider of such a service becomes dependent on an operator with the specific IN functionality.

2. Still address analysis in GWa (see Extensions).

ADVANTAGES

Call establishment in one step only.

Since IN service logic is coupled to the GW application, value added functionality can easily be included (such as automatically finding the closest or available gateway).

Number analysis can now be coupled with other services such as short numbers for a virtual network, and UPT.

EXTENSIONS AND ENCHANCEMENTS TO THE PRESENT INVENTION

The problem area: GWa still needs to analyse the B-number to find the GW closest to user B. Having these number analysis functions distributed implies that many Gws must be updated when changes in the network occur. This is a network management problem which the extension to the basic invention solves.

Existing solutions and problems with these: The Gws can perform complete number analysis functions with B-number as input and Gwb address as result. This analysis must then be in every GW and the network will be hard to maintain.

The invention: An extension to the basic invention can be made to solve the problem in such a way as to find the closest terminating gateway for any terminating B-number.

IN can be used to locate the terminating gateway. Suppose that A calls a B-number. In addition to finding the E.164 number to Gwa, IN can also find the IP-address to Gwb which is the gateway closest to the user B.

1. The IN maintains a list of the gateways, with their respecitve IP-address and the respective area code(s).
2. Based on the area code of the B-number the IP-address to the closest GW is found.
3. In the call setup towards Gwa the IP-address of Gwb is included.
4. Gwa uses the received Gwb IP-address in the remaining call handling process.

A proposal/example on how this can be transferred on ISUP (IAM message)/DSS1 (SETUP message):

CallingPartyNumber: A-number
CalledPartyNumber: Gwa-number
RedirectingNumber: B-number
Subaddress: Gwb IP-address The information flow (see FIG. 2) is as follows:

a=A dials: (IN service prefix+B-number)
   in one sequence
b=Call routed to IN:
   CallingPartyNumber: A-number
   CalledPartyNumber: (IN service prefix+B-number)
c=Call routed to Gwa:
   CallingPartyNumber: A-number
   CalledPartyNumber: Gwa-number
   RedirectingNumber: B-number
   Subaddress: Gwb IP-address

BROADENING

The application has only addressed the Internet as the carrier or bypass network but the application can be broadened to, in general, address networks based on IP-technology and even to other packet based networks or technology, such as Frame Relay, ATM, hybrids of these, and so on.

Furthermore, the present invention is applicable not oly to international and long distance services but also to any other geographically segmented services (e.g. local, regional, national).

REFERENCES

WO-SE00680: "Speech connection set-up method for interconnected networks registering network address of users who has a telephone and PC on network, with telephone system and uses address when making call connection".

Comments: The WO-SE00680 patent is related to this patent application in the sense that it too uses certain IN functions to solve certain addressing problems related to the domain of gateways. Note, however, that it addresses a different problem within this domain. The following is a list to illustrate some of the differences:

WO-SE00680 addresses an application area that have users connected to special PCs (PC connected telephones)—not plain old PSTN/ISDN telephones.

WO-SE00680 uses IN primarily to locate called users using special PCs on a data network—not handle call set-up of telephone-to-telephone calls over the internet in one single phase.

WO-SE00680 uses a register function to keep track of the location of the users and the gateway that the respective users have registered with—this patent application does not use such an explicit register function.

WO-SE00680 transfers the IP-address of a called user to the gateway that the user has a priori registered with—In its basic form this application only transfers the B-number of the called user. In its extended form the B-number and the IP-address of the terminating gateway is transfered to the originating gateway for the purpose of addressing locating the nearest gateway.

What is claimed is:

1. Method for setting up telephone-to-telephone calls using telephones connected to a PSTN/ISDN access network and using a separate packet-switched network as a by-pass network, wherein telephone gateways (GW) provide bridges between the PSTN/ISDN access network and said by-pass network, and connections being established between a calling party (A) telephone and a first gateway (GWa) and between a second gateway (GWb) and a called party (B) telephone, said method comprising the steps of:

dialing, by a calling party (A) in a one-step procedure, a by-pass network service prefix together with the number of a called party (B), said by-pass network service prefix comprising an IN-service prefix, and analyzing said by-pass network service prefix to identify a relevant IN service for thereby routing the call to an IN node which can execute this IN service, the IN service establishing a call to said first gateway (GWa) selected from one of a plurality of gateways (GW), whereby said first gateway is made service transparent to the calling party (A), wherein a list of said gateways is stored in the IN network, as well as a list of respective IP-addresses and respective area code(s) associated with each of said gateways.

2. Method as claimed in claim 1, wherein said IN service is adapted to find the closest gateway (GW) by analyzing the calling party (A) number, each of said plurality of gateways being associated with geographic areas associated with calling party locations.

3. Method as claimed in claim 1, further comprising the step of:

after the IN service has established the call to the first gateway (Gwa), including an associated gateway number (Gwa) as destination number in a call set-up message, as well as the calling party (A) number and the called party (B) number.

4. Method as recited in claim 1, further comprising the step of:

using the area code of the called party (B) number to find the IP-address of said second gateway (GWb).

5. Method as recited in claim 1, further comprising the step of:

including in a call set-up message towards the first gateway (GWa) the IP-address of the second gateway (GWb), so that the first gateway (GWa) can use the received second gateway (GWb) IP-address in the remaining call handling process.

* * * * *

UNITED STATES PATENT AND TRADEMARK OFFICE
CERTIFICATE OF CORRECTION

| | |
|---|---|
| PATENT NO. | : 6,956,843 B1 |
| APPLICATION NO. | : 09/555592 |
| DATED | : October 18, 2005 |
| INVENTOR(S) | : Oyvind Breivik et al. |

It is certified that error appears in the above-identified patent and that said Letters Patent is hereby corrected as shown below:

Column 1, Line 11, delete "separat" and insert -- separate --, therefor.

Column 1, Line 24, delete "oly" and insert -- only --, therefor.

Column 1, Line 52, delete "internation" and insert -- international --, therefor.

Column 4, Line 22, delete "respecitve" and insert -- respective --, therefor.

Column 4, Line 54, delete "oly" and insert -- only --, therefor.

Signed and Sealed this

Twenty-seventh Day of November, 2007

JON W. DUDAS
*Director of the United States Patent and Trademark Office*